(12) United States Patent  
Onimaru et al.

(10) Patent No.: US 6,742,480 B2
(45) Date of Patent: Jun. 1, 2004

(54) HEAT STORAGE TANK

(75) Inventors: Sadahisa Onimaru, Chiryu (JP); Toshio Morikawa, Toyota (JP); Koichi Ban, Tokai (JP); Takashi Toyoshima, Obu (JP)

(73) Assignees: Nippon Soken, Inc., Nishio (JP); Denso Corporation, Kariya (JP)

( * ) Notice: Subject to any disclaimer, the term of this patent is extended or adjusted under 35 U.S.C. 154(b) by 41 days.

(21) Appl. No.: 10/174,793

(22) Filed: Jun. 19, 2002

(65) Prior Publication Data

US 2003/0006239 A1 Jan. 9, 2003

(30) Foreign Application Priority Data

Jul. 4, 2001 (JP) .......................... 2001-203660
Nov. 12, 2001 (JP) .......................... 2001-346242

(51) Int. Cl.$^7$ ................................. F01P 3/20
(52) U.S. Cl. .................. 123/41.01; 123/41.14
(58) Field of Search ................. 123/41.14, 41.01

(56) References Cited

U.S. PATENT DOCUMENTS 5,662,072 A * 9/1997 Suzuki et al. ............ 123/41.14
5,896,833 A * 4/1999 Aoki et al. ............... 123/41.14
6,477,990 B2 * 11/2002 Toyoshima et al. ....... 123/41.14
6,571,753 B1 * 6/2003 Jaeger ...................... 123/41.14

FOREIGN PATENT DOCUMENTS

| DE | 36 24 261 | * | 1/1988 | ........... B60H/1/00 |
| DE | 38 19 317 | | 12/1988 | |
| DE | 38 40 977 | | 6/1989 | |
| DE | 197 37 818 | | 3/1998 | |
| JP | 10-071840 | | 3/1998 | |

* cited by examiner

Primary Examiner—Henry C. Yuen
Assistant Examiner—J. A. Benton
(74) Attorney, Agent, or Firm—Harness, Dickey & Pierce PLC

(57) ABSTRACT

In a heat storage tank, a discharge port of an introduction passage is covered by a cup-shaped collision member constructed by a shield portion and a guide cover. In addition, a mixture protection plate having plural through holes is disposed in a tank body between the collision member and an inner surface of the tank body. Therefore, a high-speed water stream, upwardly injected from the discharge port, collides with the shield portion, and turns its flow direction by an approximately right angle. Thereafter, the water stream is guided by the guide cover to a lower side of the mixture protection plate. Accordingly, it can prevent water stored in the tank body from being mixed even when the injection water stream has a high speed.

13 Claims, 10 Drawing Sheets

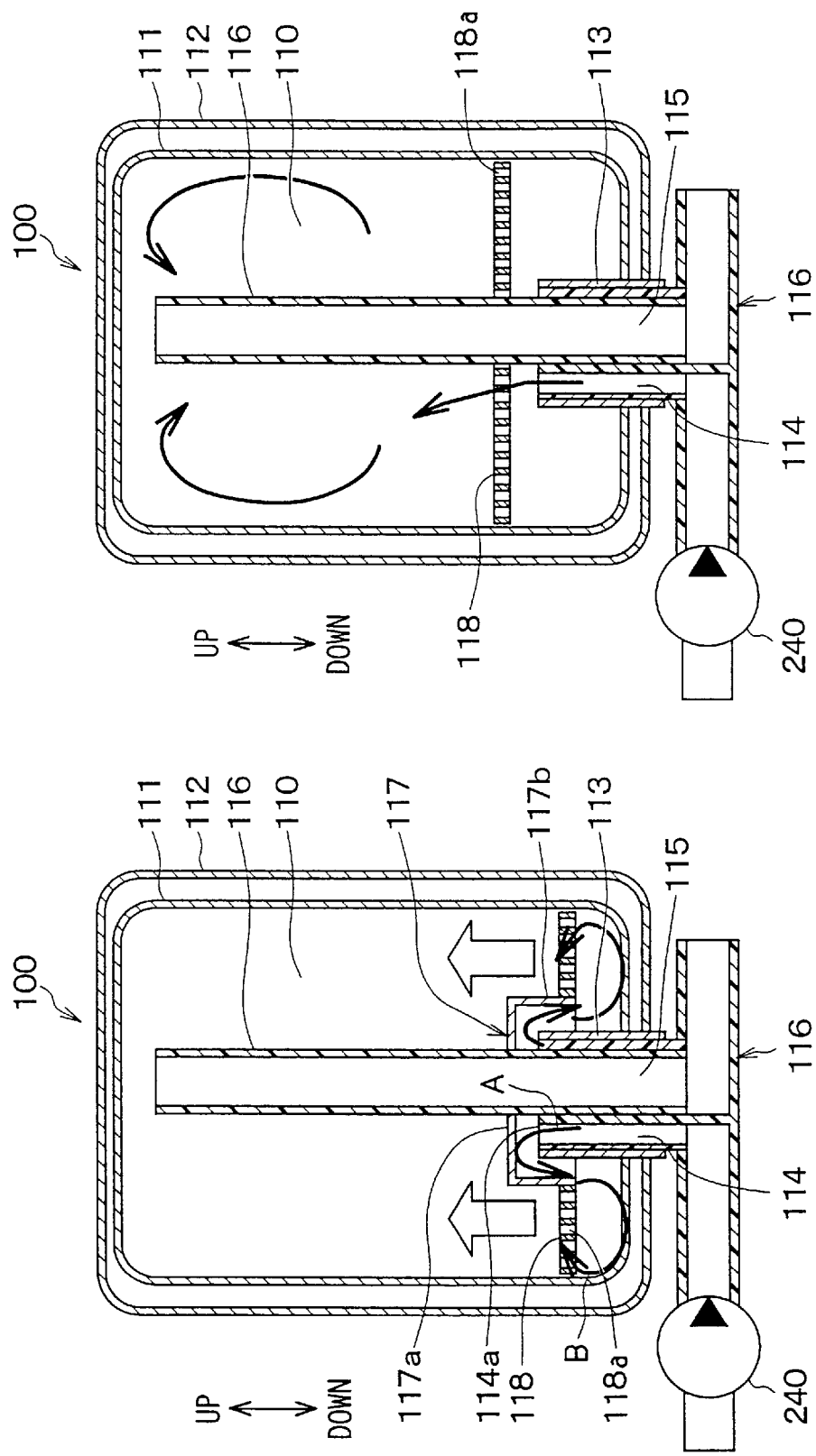

HEAT STORAGE TANK

CROSS-REFERENCE TO RELATED APPLICATION

This application is related to and claims priority from Japanese Patent Applications No. 2001-203660 filed on Jul. 4, 2001, and No. 2001-346242 filed on Nov. 12, 2001, the contents of which are hereby incorporated by reference.

BACKGROUND OF THE INVENTION

1. Field of the Invention

The present invention relates to a heat storage tank in which a fluid is thermally insulated and stored, and is suitably applied to a vehicle heat storage tank in which cooling water (hot water) for cooling a vehicle engine is thermally insulated and stored.

2. Description of Related Art

For example, in a heat storage tank disclosed in JP-A-10-71840, a mixture protection plate having plural holes is provided around a water inlet, so that it can restrict engine-cooling water (hot water) in a tank body from being forcibly agitated and mixed due to an injection water from the water inlet.

However, in this heat storage tank, the following problems have been found by detail studies performed by the present inventors. Here, opening areas of the water inlet and a water outlet provided in the tank body are need to be made as small as possible to improve thermal insulation performance of the heat storage tank. When the opening area of the water inlet is made smaller, a flow speed of injection water from the water inlet into the tank body becomes higher in a case that an amount of water flowing into the tank body is large. Therefore, the injection water may directly passes through the holes provided in the mixture protection plate while its flowing direction is not largely changed by the mixture protection plate. Accordingly, water in the tank body is stirred, and forced convention of water in the tank body is generated.

SUMMARY OF THE INVENTION

In view of the above problem, it is an object of the present invention to provide a heat storage tank which can effectively prevent a fluid in a tank body from being mixed due to a fluid injection from a discharge port even when the fluid flowing from the discharge port into the tank body has a high speed.

According to the present invention, in a heat storage tank, a first pipe member defining an introduction passage has a discharge port from which a fluid introduced through the introduction passage is injected into a tank body, a collision member is disposed in the tank body so that the fluid flowing from the discharge port collides with the collision member, a second pipe member defining a discharge passage has an introduction port from which the fluid in the tank body is introduced to be discharged outside the tank body through the discharge passage. The introduction port is positioned in the tank body at a side opposite to the discharge port with respect to the collision member. In addition, the collision member includes a shield portion disposed opposite to the discharge port to be separated from the discharge port by a predetermined dimension, and a guide portion, extending from the shield portion to a side of the discharge port, for guiding the fluid flowing along the shield portion toward a side of the discharge port. Accordingly, even when the flow speed of the fluid flowing from the discharge port is high, it can effectively prevent the fluid in the tank body from being mixed due to the fluid flowing from the discharge port. Thus, heat-storage performance of the fluid in the tank body can be improved.

Preferably, a mixture protection plate, for preventing the fluid in the tank body from being mixed due to the fluid flowing from the discharge port, is provided to have a plurality of through holes through which the fluid flowing from the discharge port flows. In addition, the mixture protection plate is disposed between the collision member and an inner surface of the tank body. Therefore, the fluid from the discharge port passes through the through holes of the mixture protection plate after colliding with the shield portion and after being guided by the guide portion. Accordingly, it can further effectively prevent the fluid in the tank body from being mixed due to the injection fluid from the discharge port.

On the other hand, according to the present invention, a plate-like shield portion is disposed in the tank body, instead of the collision member. In this case, the shield portion includes a collision wall surface with which the fluid flowing out from the discharge port collides, and a guide wall surface extending from the collision wall surface for guiding the fluid after colliding with the collision wall surface. The collision wall surface is disposed to face the discharge port and to be separated from the discharge port by a predetermined distance, and the guide wall surface is provided such that the fluid after colliding with the collision wall surface is prevented from directly flowing toward the introduction port. In addition, the introduction port and the discharge port are positioned at both opposite sides relative to the shield portion, and the collision wall surface and the guide wall surface of the shield portion have a moment center (G) that is located at a position separated from the discharge passage. Accordingly, it can effectively prevent the fluid in the tank body from being mixed due to the fluid injection from the discharge port.

Preferably, the moment center (G) is located at a position offset to a side of the discharge passage relative to the introduction passage. Therefore, the fluid after colliding with the collision wall surface can be effectively guided by the guide wall surface.

BRIEF DESCRIPTION OF THE DRAWINGS

Additional objects and advantages of the present invention will be more readily apparent from the following detailed description of preferred embodiments when taken together with the accompanying drawings, in which:

FIG. 4A is a schematic diagram showing a water flow in the heat storage tank shown in FIG. 2, and FIG. 4B is a schematic diagram showing a water flow in a comparison heat storage tank;

DETAILED DESCRIPTION OF THE PRESENTLY PREFERRED EMBODIMENTS

The present invention will be described hereinafter with reference to the appended drawings.
(First Embodiment)

Figure 1:
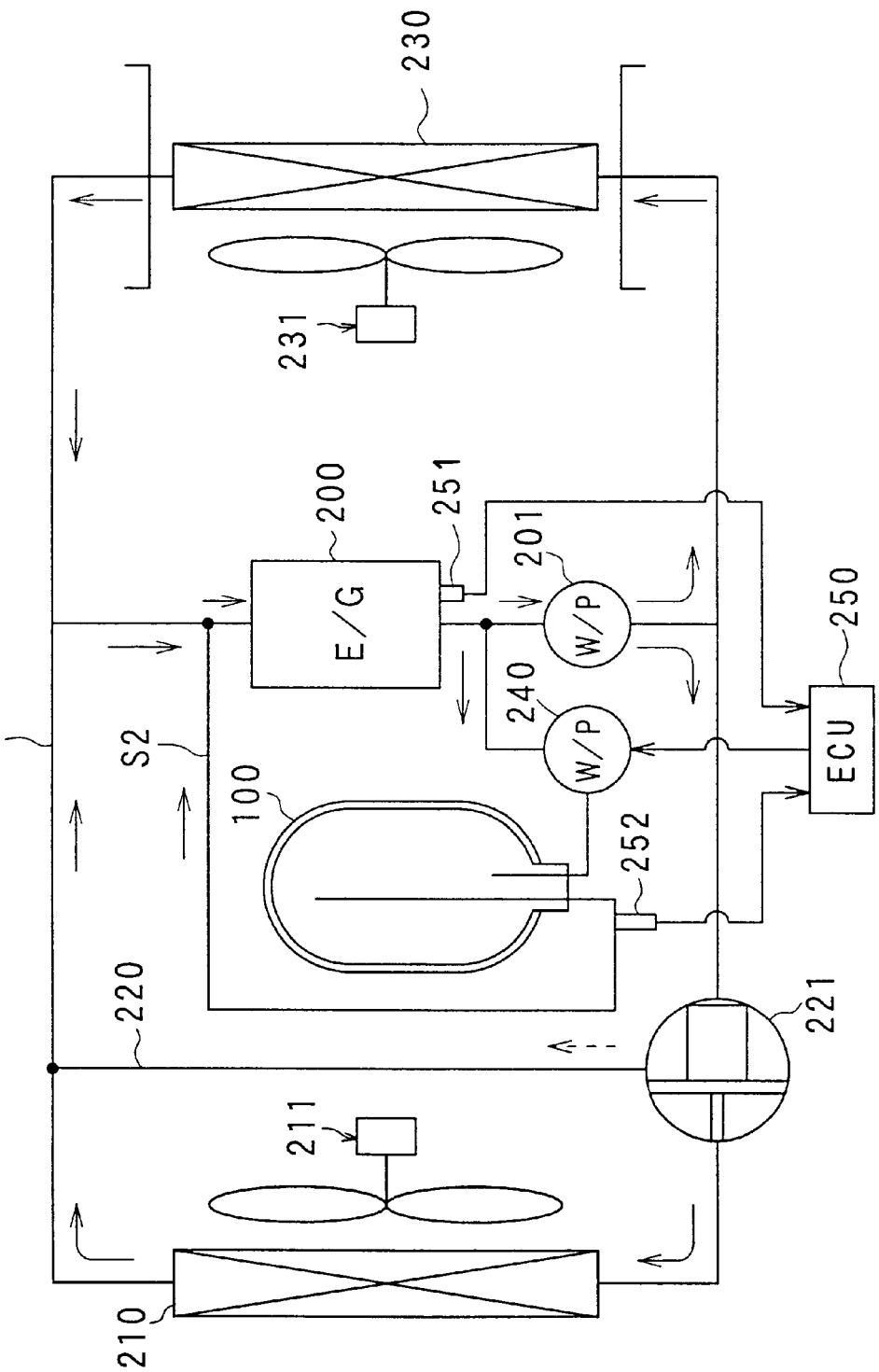
FIG. 1 is a schematic diagram showing a vehicle water circuit according to embodiments of the present invention.

In the first embodiment, as shown in FIG. 1, a heat storage tank 100 according to the present invention is typically used for a heat storage tank in a vehicle water circuit. A radiator 210 provided in the water circuit is a heat exchanger which cools water by performing heat-exchange between the water from a water-cooled engine (E/G) 200 and air. The water flows through the engine 200 and cools the engine 200. A bypass circuit 220 is a water circuit through which water circulates while bypassing the radiator 210. A thermostat 221 adjusts an amount of water flowing into the bypass circuit 220 and an amount of water flowing into the radiator 210 so as to set the temperature of the engine 200 at a predetermined temperature. A blower 211 blows cooling air (i.e., outside air) to the radiator 210, and a heater core 230 is disposed to heat air blown into a passenger compartment using the engine-cooling water (hot water) as a heating source. A blower 231 is an interior blower for blowing air into the heater core 230.

A first pump 201 is operated using motive power from the engine 200, to circulate water in a first water circuit S1 including the engine 200, the radiator 210, the bypass circuit 220 and the heater core 230. A second pump 240 is operated by electrical power, to circulate water in a second water circuit S2 including the heat storage tank 100 and the engine 200. In the second water circuit S2, water flows into the heat storage tank 100 from the engine 200, and flows into the engine 200 from the heat storage tank 100. Since water is circulated by the second pump 240 in the second water circuit S2, the flow of water in the second water circuit S2 can be independently controlled without being affected by the first water circuit S1.

A first temperature sensor 251 is provided in the engine 200, to detect the temperature of the engine 200 or the temperature of water circulating in the engine 200. A second temperature sensor 252 is provided in the second water circuit S2 at a water outlet side of the heat storage tank 100 to detect the temperature of water (hot water) flowing out from the heat storage tank 100. Detection signals from the temperature sensors 251, 252 are input to an electronic control unit (ECU) 250. The ECU 250 controls the second pump 240 based on the detection signals from the temperature sensors 251, 252 and the like.

Next, the heat storage tank 100 will be described in detail with reference to FIG. 2. Water is thermally insulated and stored in a tank body 110. The tank body 110 has a double-wall structure including an inside tank portion 111 and an outside tank portion 112. Both the tank portions 111, 112 are made of a material having a sufficient corrosion-resisting performance (e.g., stainless steel). Here, a vacuum condition is almost maintained between both the tank portions 111, 112 so as to form a heat-insulating layer therebetween. A pipe member 113 penetrates through both tank portions 111, 112 to be communicated with the tank body 110, and is welded to both the tank portions 111, 112 at a lower side position of the tank body 110.

Passage members made of a material having a sufficient heat-insulating performance (e.g., nylon group resin) for defining an introduction passage 114 and a discharge passage 115 are disposed in the pipe member 113. Water is introduced into the tank body 110 through the introduction passage 114, and water stored in the tank body 110 is discharged to an outside of the tank body 110 through the discharge passage 115. Further, a passage forming member 116 includes a valve housing of a valve (not shown) for opening and closing both passages 114, 115, and is also attached to the pipe member 113. In the first embodiment, the passage forming member 116 includes the passage member defining the introduction passage 114, and the passage member defining the discharge passage 115. Here, a clearance between the passage forming member 116 and the pipe member 113 is water-tightly sealed by a seal member (not shown) such as an o-ring and a gasket.

The introduction passage 114 and the discharge passage 115 are disposed adjacent to each other, and are partitioned from each other by a wall member of the passage forming member 116. Therefore, a discharge port 114a of the introduction passage 114 is placed at a position offset from a center axis of the tank body 110 while an introduction port 116a of the discharge passage 115 is placed on the center axis of the tank body 110. A pipe 116a is inserted into the discharge passage 115, and a collision member 117 is attached to the pipe 116a around the discharge port 114a. Therefore, water, discharged from the discharge port 114a, collides with the collision member 117, and high-temperature water, stored at an upper side in the tank body 110, is introduced into the discharge passage 115 through the pipe 116a. Here, the pipe 116a is made of a material such as a resin having a sufficient heat-insulating performance, and the collision member 117 is made of a material such as a stainless steel having a sufficient corrosion-resisting performance. In the first embodiment, both the pipe 116a and the collision member 117 are joined together to be integrated.

Figure 2:
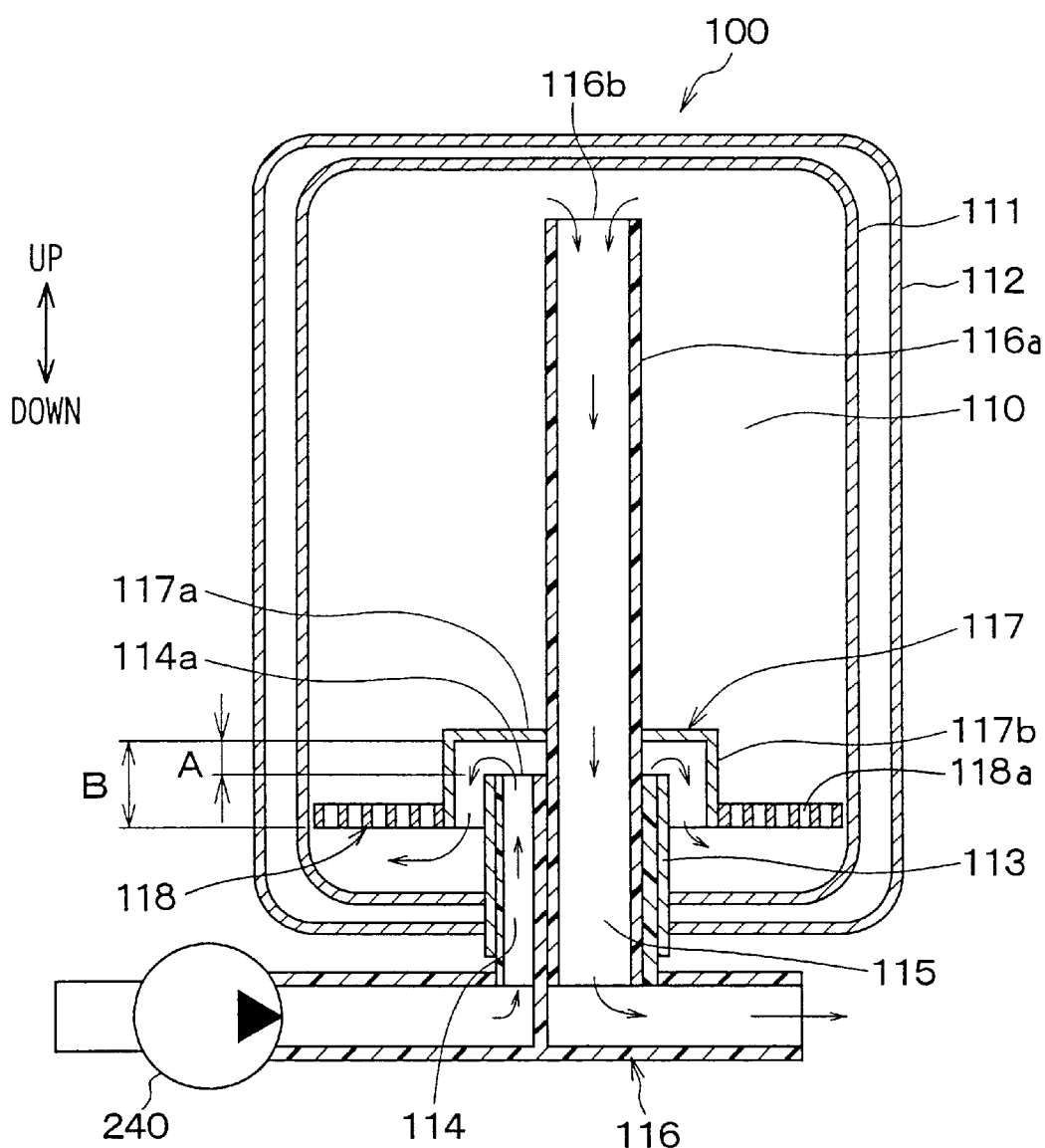
FIG. 2 is a schematic diagram showing a heat storage tank according to a first embodiment of the present invention.
Figure 3A:
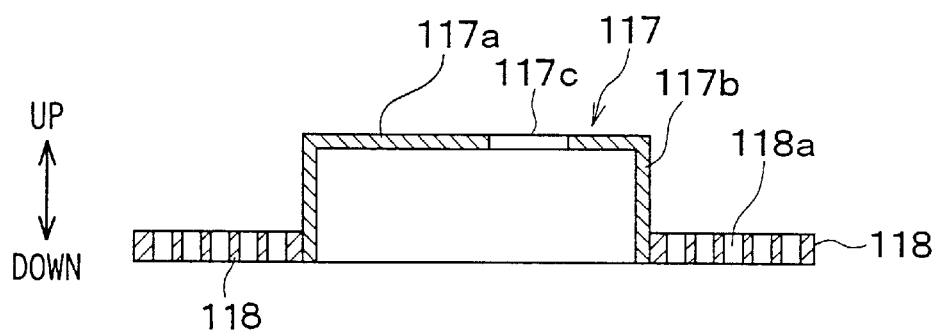
FIG. 3A is a sectional view showing a collision member and a mixture protection plate according to the first embodiment.
Figure 3B:
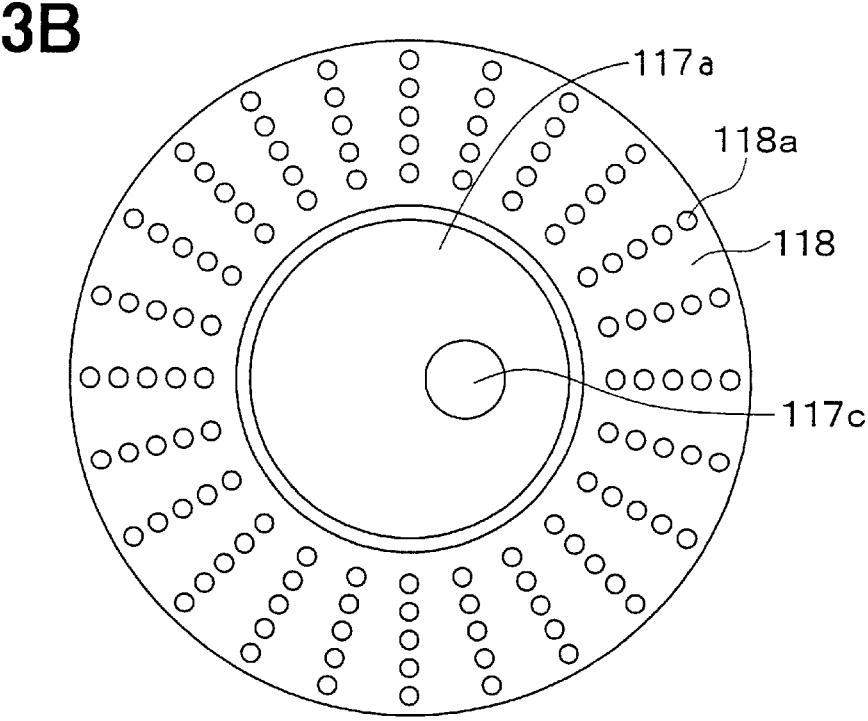
FIG. 3B is a bottom view of FIG. 3A.

As shown in FIGS. 2, 3A, 3B, the collision member 117 includes a disc-shaped shield portion 117a having an insertion hole 117c, and a cylindrical guide cover 117b formed into an approximate cylindrical shape. The shield portion 117a is disposed to be opposite to the discharge port 114a, and is separated from the discharge port 114a by a predetermined dimension. That is, the shield portion 117a extends in a direction approximately perpendicular to an opening direction of the discharge port 114a. The guide cover 117b extends from the peripheral end of the shield portion 117a to a side of the discharge port 114a so as to cover the discharge port 114a around all its outer peripheral portion at a position separated therefrom by a predetermined dimension. The pipe 116a is tightly inserted into the insertion hole 117c of the collision member 117.

As shown in FIG. 2, a mixture protection plate 118 having plural through holes 118a through which water passes is provided at an end portion of the collision member 117. That is, in the first embodiment, the mixture protection plate 118 is provided at an end portion of the guide cover 117b opposite to the shield portion 117a, between the collision member 117 and an inner wall of the tank body 110. The mixture protection plate 118 is provided so as to partition the tank body 110 into a side of the discharge port 114a and a side of an introduction port 116b of the pipe 116a. In the first embodiment, the collision member 117 and the mixture protection plate 118 are integrally formed by deformation processing such as pressing and drawing.

Further, the discharge port 114a is covered by the collision member 117 fully when being viewed from a direction perpendicular to an injection direction (i.e., opening direction, up-down direction in FIG. 2) of water from the discharge port 114a. That is, an axial dimension B of the guide cover 117b in the axial direction of the tank body 110 is made larger than a dimension A between the discharge port 114a and the shield portion 117a so that the discharge port 114a is positioned within the collision member 117.

Next, operations of the water circuit according to the first embodiment will be described. A heat storage mode is performed when the engine 200 is operated and a temperature T1 of water discharged from the engine 200, detected by the first temperature sensor 251, is higher than a predetermined temperature T0. Specifically, in the heat storage mode, high-temperature water discharged from the engine 200 is supplied to the heat storage tank 100 by driving the second pump 240, and is stored in the heat storage tank 100. The predetermined temperature T0 is a temperature at which the engine 200 can be determined to end a warming-up operation, and is approximately 80° C. in the first embodiment.

A warming-up mode is performed when the operation of the engine 200 is started. Specifically, in the warming-up mode, the second pump 240 is operated at the same time when the engine 200 is started. Accordingly, high-temperature water stored in the heat storage tank 100 is supplied to the engine 200, so that the warming-up operation of the engine 200 can be facilitated. Further, when the warming-up operation is performed in winter, since high-temperature hot water can be supplied to the heater core 230 directly after starting the engine 200, the passenger compartment can be rapidly heated.

Next, a cold-water holding mode is performed when the engine 200 is driven and a temperature T2 of water discharged from the heat storage tank 100, detected by the second temperature sensor 252 is lower than a predetermined temperature T0. Specifically, in the cold-water holding mode, the second pump 240 is stopped. When it is determined that all the high-temperature water thermally insulated and stored in the heat storage tank 100 is discharged in the warming-up mode, the operation mode is switched from the warming-up mode to the cold-water holding mode. Therefore, low-temperature water discharged from the engine 200 is stored in the heat storage tank 100. That is, in the cold-water holding mode, it can prevent low-temperature water from flowing into the engine 200 from the heat storage tank 100, thereby facilitating the warming-up operation of the engine 200. When a capacity of the tank body 110 is set to be equal to or larger than an amount of water within the engine 200, the warming-up operation of the engine 200 can be effectively enhanced. Here, when the temperature T1 becomes equal to or higher than the predetermined temperature T0, the cold-water holding mode is switched to the heat storage mode.

A hot-water holding mode is performed when the engine 200 is stopped. Specifically, in the hot-water holding mode, the second pump 240 is stopped, so that the high-temperature water stored in the heat storage mode is thermally insulated and stored in the heat storage tank 100.

Next, operational effects of the heat storage tank 100 according to the first embodiment will be described. In the first embodiment, the collision member 117, constructed by the shield portion 117a and the guide cover 117b, has an approximate cup shape, and is provided around the discharge port 114a. Therefore, as shown in FIG. 4A, high-speed water injected from the discharge port 114a toward an upper side collides with the shield portion 117a. Thereafter, the flow direction of the injection water turns by an approximately right angle (horizontally in FIG. 4), and is guided by the guide cover 117b to be turned to a lower side, as shown by the arrow A in FIG. 4A. Then, after the flow speed of the injection water is sufficiently reduced, water reaches to a lower side of the mixture protection plate 118, as shown by the arrow B in FIG. 4A. Since the injection stream can be sufficiently turned by the collision member 117, it can prevent water stored in the tank body 110 from being agitated even when the water injected from the discharge port 114a has a high flow speed, thereby improving heat-storage performance of water in the heat storage tank 100.

When the collision member 117 described in the first embodiment is not provided as in a comparison heat storage tank shown in FIG. 4B, a high-speed water stream injected from a discharge port of the introduction passage 114 may directly pass through holes 118a in a mixture protection plate 118, and may directly introduce to an upper side in the tank body 110. In this case, as shown by the arrows in FIG. 4B, water in the tank body 110 is mixed due to the water directly flowing into the upper side of the tank body 110.

Further, according to the first embodiment, since the guide cover 117b is formed into the approximate cylindrical shape so as to cover the discharge port 114a at its entire peripheral end and around its peripheral end, water stored in the tank body 110 can be accurately prevented from being mixed. Further, the discharge port 114a is covered by the collision member 117 fully when being viewed from the direction perpendicular to the injection water direction. Therefore, a flow-turning interval, in which the injection water from the discharge port 114a turns by an inner surface of the collision member 117, is made longer. Since the injection flow direction of water can be surely turned, the flow speed of the injection water can be sufficiently reduced. As a result, water stored in the tank body 110 can be surely prevented from being agitated even when the injection water has a high flow speed.

In the first embodiment, the injection water from the discharge port 114a is made to collide with the shield portion 117a, and is turned by an approximately right angle. Thereafter, the water flow direction is turned to the lower side by the guide cover 117b, so that the injection water stream from the discharge port 114a is tuned by an angle larger than a right angle. That is, the injection water stream is U-turned by the collision member 117. In the first embodiment, the injection water stream from the discharge port 114a can be turned by an angel equal to or larger than 90° by an another structure without being limited to this structure.

(Second Embodiment)

Figure 5A:
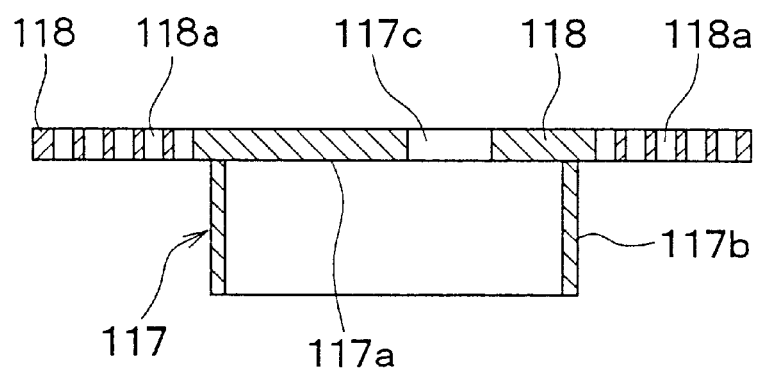
FIG. 5A is a sectional view showing a collision member and a mixture protection plate according to a second embodiment of the present invention.
Figure 5B:
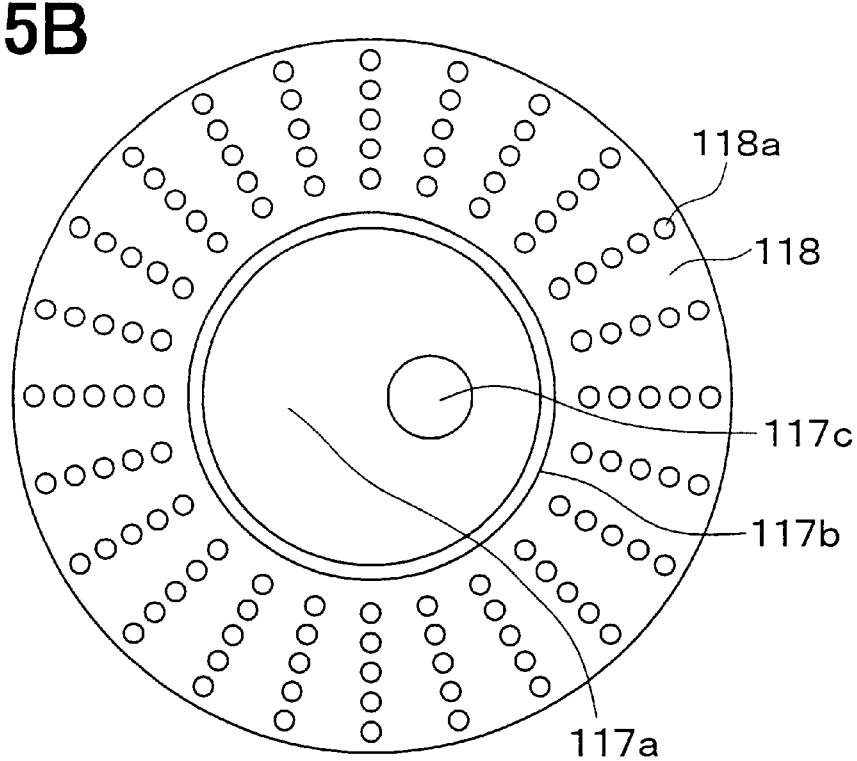
FIG. 5B is a bottom view of FIG. 5A.

In the second embodiment, as shown in FIGS. 5A, 5B, the mixture protection plate 118 is provided at the peripheral side end of the shield portion 117a in the collision member 117. The shield portion 117a and the mixture protection plate 118 are integrally formed by pressing a plate material, and the guide cover 117b having an approximate cylindrical shape is bonded to this integrally formed member by a bonding means such as welding and brazing. Even in this case, the advantage described in the first embodiment can be obtained.

(Third Embodiment)

Figure 6A:
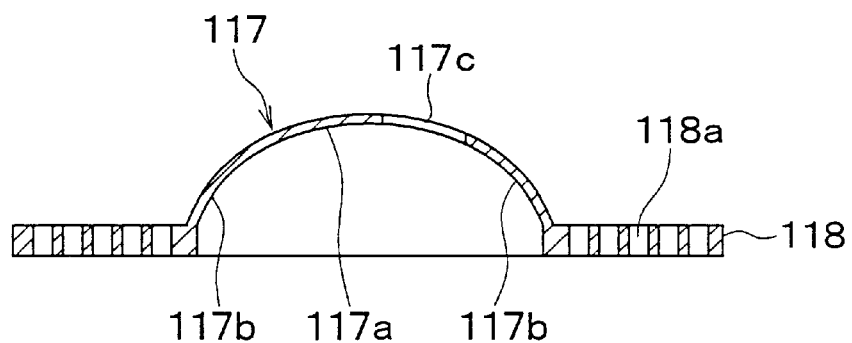
FIG. 6A is a sectional view showing a collision member and a mixture protection plate according to a third embodiment of the present invention.
Figure 6B:
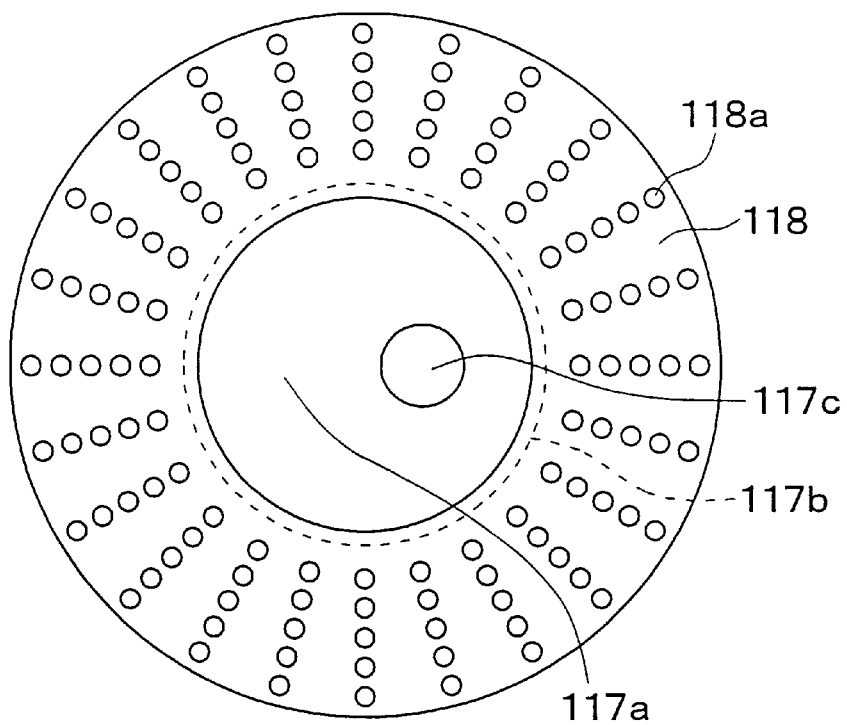
FIG. 6B is a bottom view of FIG. 6A.

In the third embodiment, as shown in FIGS. 6A, 6B, a wall surface of the collision member 117 including the shield portion 117a and the guide cover 117b is formed into a dome shape having a curvature center at the side of the discharge port 114a. The wall surface of the collision member 117 may have another shape such as a spindle shape without being limited to a spherical shape. Even in the third embodiment, the advantage described in the first embodiment can be obtained.

(Fourth Embodiment)

Figure 7A:
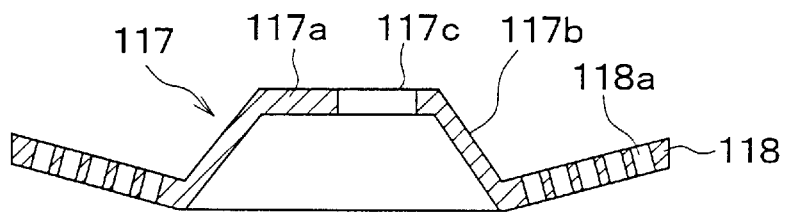
FIG. 7A is a sectional view showing a collision member and a mixture protection plate according to a fourth embodiment of the present invention.
Figure 7B:
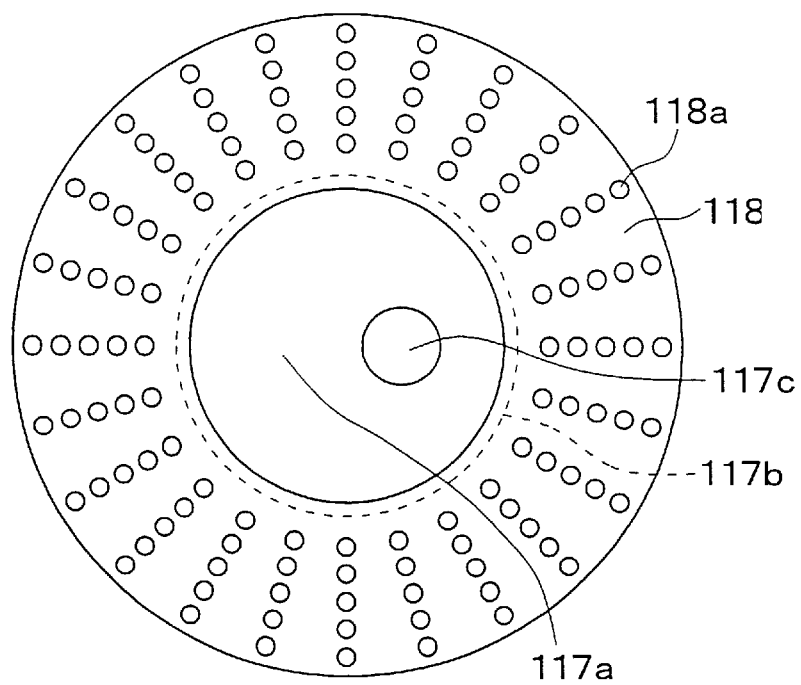
FIG. 7B is a bottom view of FIG. 7A.

In the fourth embodiment, as shown in FIGS. 7A, 7B, the guide cover 117b has a taper shape where its inner radial dimension is enlarged toward its opening side, and the mixture protection plate 118 is also tilted with respect to a plane perpendicular to the injection flow direction of water. That is, in the fourth embodiment, the guide cover 117b is tilted relative to the opening direction by a predetermined tilt angle. Even in the fourth embodiment, the advantage described in the first embodiment can be obtained.

(Fifth Embodiment)

Figure 8A:
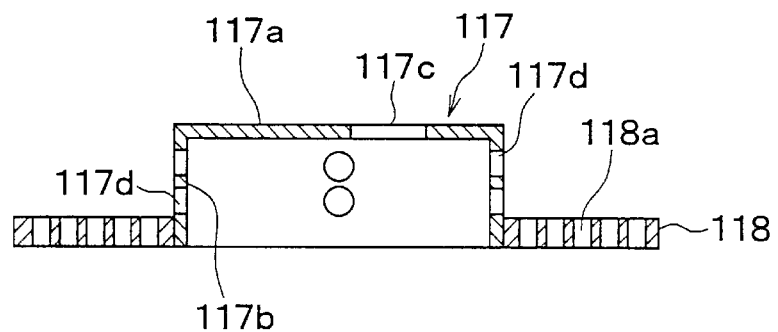
FIG. 8A is a sectional view showing a collision member and a mixture protection plate according to a fifth embodiment of the present invention.
Figure 8B:
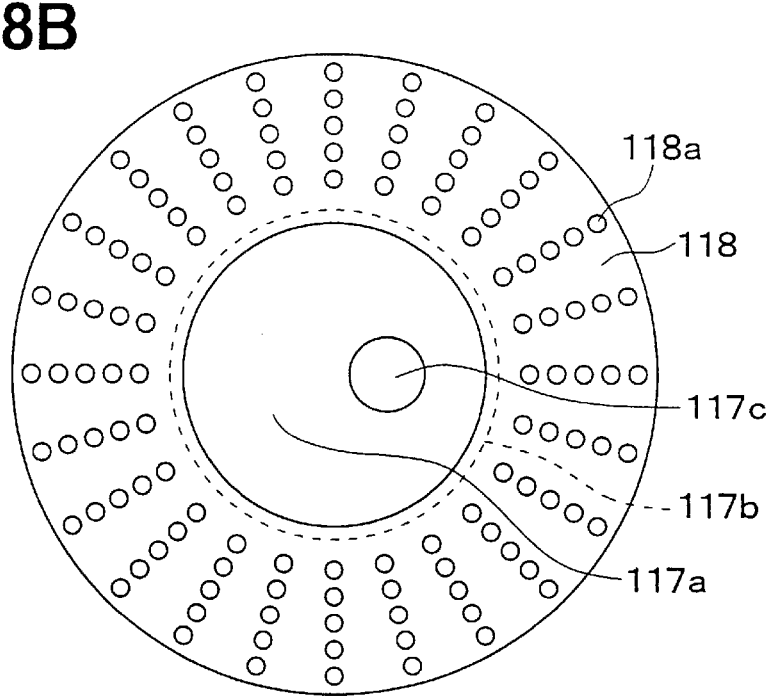
FIG. 8B is a bottom view of FIG. 8A.

In the fifth embodiment, as shown in FIGS. 8A, 8B, the guide cover 117b of the collision member 117 has holes 117d through which water flows, thereby preventing an excessive pressure loss from being generated by the collision member 117 while effectively preventing water stored in the tank body 110 from being mixed by an injection water flow.

(Sixth Embodiment)

Figure 9A:
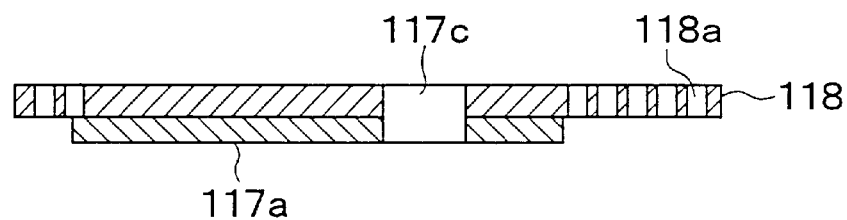
FIG. 9A is a sectional view showing a collision member and a mixture protection plate according to a sixth embodiment of the present invention.
Figure 9B:
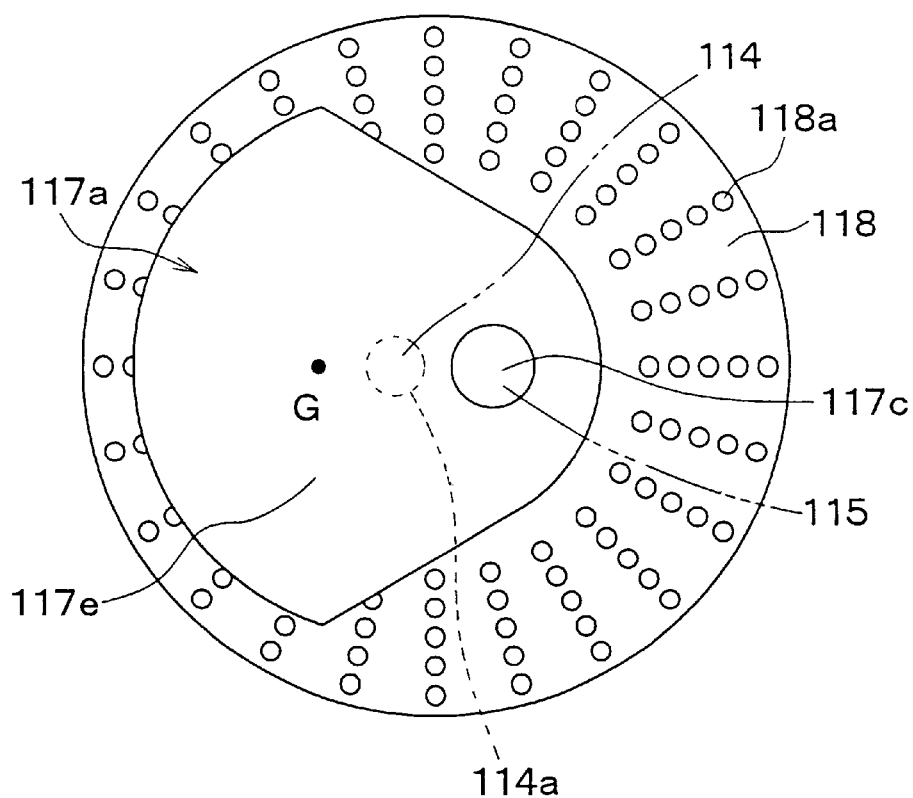
FIG. 9B is a bottom view of FIG. 9A.

In the sixth embodiment, as shown in FIGS. 9A, 9B, the shield portion 117a is also used as a guide portion in place of the guide cover 117b described in the above-described embodiments. Specifically, injection water (fluid) collides with a collision portion on a wall surface 117e of the shield portion 117a, corresponding to the introduction passage 114 (indicated by a two-dot chain line in FIG. 9B), and is guided along the wall surface 117e of the shield portion 117b around the collision portion. That is, the wall surface part of the shield portion 117a without colliding with the injection water is used as a guide portion (guide surface). Further, as shown in FIG. 9B, the shield portion 117a is formed in a fan shape so that a moment center G of a fan-shaped surface of the shield portion 117a is located at a side of the introduction passage 114 than a side of the discharge passage 115. Here, the fan-shaped wall surface 117e of the shield portion 117a extends to a side of the introduction passage 114, and the moment center G is a position at which a moment of area is balanced on the entire surface.

Accordingly, the direct injection water can be surely interrupted by the shield portion 117a, in an area around the introduction passage 114 on the mixture protection plate 118, where the injection water readily passes through the mixture protection plate 118. Therefore, it can prevent water in the tank body 110 from being mixed due to the direct injection water. Further, in the sixth embodiment, the shield portion 117a is bonded to the mixture protection plate 118 having a disc shape to close a part of the through holes 118a of the mixture protection plate 118.

(Seventh Embodiment)

Figure 10A:
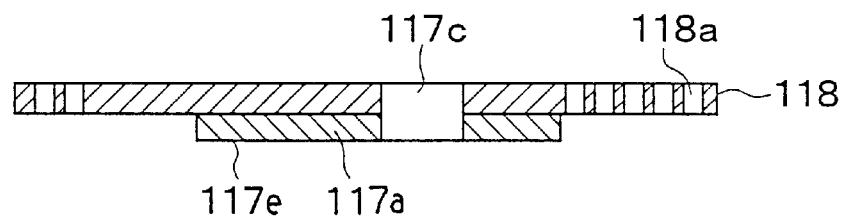
FIG. 10A is a sectional view showing a collision member and a mixture protection plate according to a seventh embodiment of the present invention.
Figure 10B:
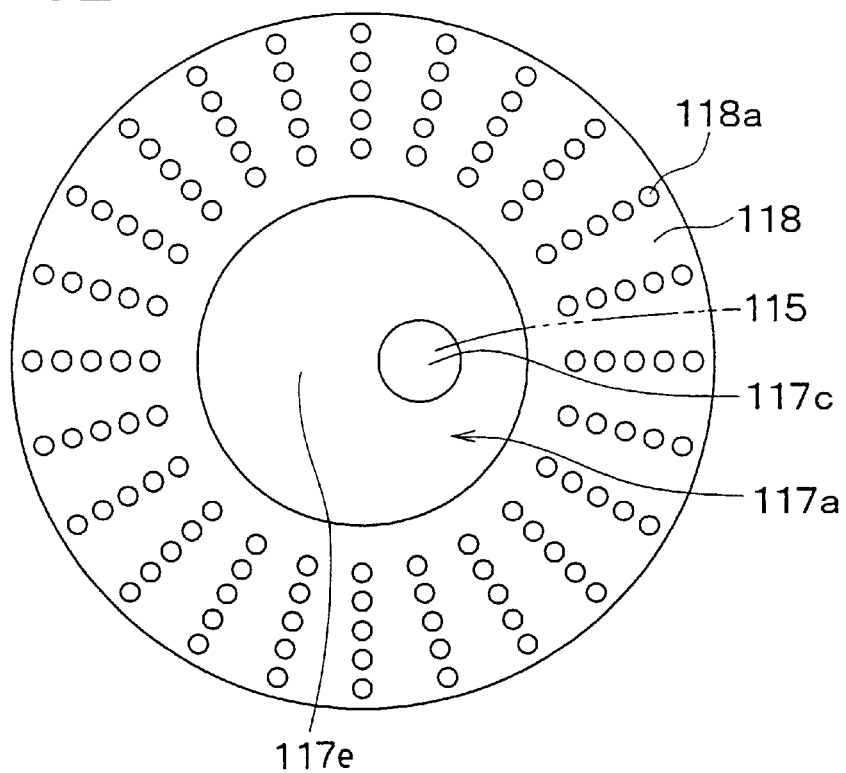
FIG. 10B is a bottom view of FIG. 10B.

In the seventh embodiment, as shown in FIGS. 10A, 10B, a shield portion 117a without a hole is attached onto the mixture protection plate 118 only at a position with which the injection water directly collides. Accordingly, the direct injection water can be surely interrupted, thereby preventing water in the tank body 110 from being mixed due to the injection flow. Even in the seventh embodiment, the moment center G is located at a side of the introduction passage 114, relative to the discharge passage 115.

Although the present invention has been fully described in connection with the preferred embodiments thereof with reference to the accompanying drawings, it is to be noted that various changes and modifications will become apparent to those skilled in the art.

For example, the heat storage tank according to the present invention can be used for another system without being limited to a vehicle. The pipe member 113 may penetrate the tank body 110 at another position such as its upper side without being limited to its lower side. A heat-insulating material may be disposed between the inside and outside tank portions 111, 112 without being limited to an approximate vacuum therebetween.

Further, the tank body 110 may be constructed by a single-wall structure without being limited to the double-wall structure.

Such changes and modifications are to be understood as being within the scope of the present invention as defined by the appended claims

What is claimed is:

1. A heat storage tank, comprising:
   a tank body for thermally insulating and storing a fluid;
   a first pipe member defining an introduction passage communicating with the tank body, the introduction passage having a discharge port from which the fluid introduced through the introduction passage is injected into the tank body;
   a collision member disposed in the tank body, to which the fluid flowing from the discharge port collides;
   a second pipe member defining a discharge passage having an introduction port from which the fluid in the tank body is introduced to be discharged outside the tank body through the discharge passage, the introduction port being positioned in the tank body at a side opposite to the discharge port with respect to the collision member; and
   a mixture protection plate, for preventing the fluid in the tank body from being mixed due to the fluid flowing from the discharge port, having a plurality of through holes through which the fluid flowing from the discharge port flows, the mixture protection plate being disposed between the collision member and an inner surface of the tank body; wherein
   the collision member includes a shield portion disposed opposite to the discharge port to be separated from the discharge port by a predetermined dimension, and a guide portion, extending from the shield portion to a side of the discharge port, for guiding the fluid flowing along the shield portion toward a side of the discharge port.

2. The heat storage tank according to claim 1, wherein the guide portion is provided at a position separated from the discharge port by a predetermined distance to cover the discharge port at an entire outer peripheral side of the discharge port.

3. The heat storage tank according to claim 2, wherein the discharge port is covered such that all of its outer peripheral end and a peripheral portion around its outer peripheral end are fully shielded by the guide member when being viewed from a direction perpendicular to an injection direction of the fluid discharged from the discharge port.

4. The heat storage tank according to claim 1, wherein the collision member is formed into a curved shape such that its inner surface at a side of the discharge port has a curvature center at the side of the discharge port.

5. The heat storage tank according to claim 1, wherein the guide portion has a plurality of through holes penetrating through the guide portion, through which a part of the fluid from the discharge port flows.

6. The heat storage tank according to claim 1, wherein:
the discharge port is opened in an opening direction in the tank body;
the shield portion extends in a direction approximately perpendicular to the opening direction of the discharge port;
the guide portion extends from an entire outer peripheral end of the shield portion in a direction approximately parallel to the opening direction of the discharge port to cover the discharge port; and
the guide portion is disposed to have a predetermined distance between the guide portion and the discharge port in a direction perpendicular to the opening direction of the discharge port.

7. A heat storage tank, comprising:
a tank body for thermally insulating and storing a fluid;
a first pipe member defining an introduction passage communicating with the tank body, the introduction passage having a discharge port from which the fluid introduced through the introduction passage is injected into the tank body;
a collision member disposed in the tank body, to which the fluid flowing from the discharge port collides;
a second pipe member defining a discharge passage having an introduction port from which the fluid in the tank body is introduced to be discharged outside the tank body through the discharge passage, the introduction port being positioned in the tank body at a side opposite to the discharge port with respect to the collision member, wherein:
the collision member includes a shield portion disposed opposite to the discharge port to be separated from the discharge port by a predetermined dimension, and a guide portion, extending from the shield portion to a side of the discharge port, for guiding the fluid flowing alone the shield portion toward a side of the discharge port;
the discharge port is opened in an opening direction in the tank body;
the shield portion extends in a direction approximately perpendicular to the opening direction of the discharge port;
the guide portion extends from an entire outer peripheral end of the shield portion in a direction approximately parallel to the opening direction of the discharge port to cover the discharge port; and
the guide portion is disposed to have a predetermined distance between the guide portion and the discharge port in a direction perpendicular to the opening direction of the discharge port;
the heat storage tank further comprising:
a mixture protection member disposed between the guide portion and an inner wall surface of the tank body, the mixture protection member having a plurality of through holes through which the fluid from the discharge port flows.

8. A heat storage tank, comprising:
a tank body for thermally insulating and storing a fluid;
a first pipe member defining an introduction passage communicating with the tank body, the introduction passage having a discharge port from which the fluid introduced through the introduction passage is injected into the tank body;
a collision member disposed in the tank body, to which the fluid flowing from the discharge port collides;
a second pipe member defining a discharge passage having an introduction port from which the fluid in the tank body is introduced to be discharged outside the tank body through the discharge passage, the introduction port being positioned in the tank body at a side opposite to the discharge port with respect to the collision member, wherein:
the collision member includes a shield portion disposed opposite to the discharge port to be separated from the discharge port by a predetermined dimension, and a guide portion, extending from the shield portion to a side of the discharge port, for guiding the fluid flowing alone the shield portion toward a side of the discharge port;
the discharge port is opened in an opening direction in the tank body;
the shield portion extends in a direction approximately perpendicular to the opening direction of the discharge port;
the guide portion extends from an entire outer peripheral end of the shield portion in a direction approximately parallel to the opening direction of the discharge port to cover the discharge port; and
the guide portion is disposed to have a predetermined distance between the guide portion and the discharge port in a direction perpendicular to the opening direction of the discharge port;
the heat storage tank further comprising:
a mixture protection member disposed between the shield portion and an inner wall surface of the tank body, the mixture protection member having a plurality of through holes through which the fluid from the discharge port flows.

9. The heat storage tank according to claim 1, wherein:
the discharge port is opened in an opening direction in the tank body;
the shield portion extends in a direction approximately perpendicular to the opening direction of the discharge port; and
the guide portion extends from an entire outer peripheral end of the shield portion to be tilted relative to the opening direction of the discharge port by a predetermined angle to cover the discharge port; and
the guide portion is disposed to have a distance between the guide portion and the discharge port in a direction perpendicular to the opening direction of the discharge port.

10. A heat storage tank, comprising:
a tank body for thermally insulating and storing a fluid;
a first pipe member defining an introduction passage communicating with the tank body, the introduction passage having a discharge port from which the fluid introduced through the introduction passage is injected into the tank body;
a collision member disposed in the tank body, to which the fluid flowing from the discharge port collides;
a second pipe member defining a discharge passage having an introduction port from which the fluid in the tank body is introduced to be discharged outside the tank body through the discharge passage, the introduction port being positioned in the tank body at a side opposite to the discharge port with respect to the collision member, wherein:

the collision member includes a shield portion disposed opposite to the discharge port to be separated from the discharge port by a predetermined dimension, and a guide portion, extending from the shield portion to a side of the discharge port, for guiding the fluid flowing along the shield portion toward a side of the discharge port;

the discharge port is opened in an opening direction in the tank body;

the shield portion extends in a direction approximately perpendicular to the opening direction of the discharge port;

the guide portion extends from an entire outer peripheral end of the shield portion to be tilted relative to the opening direction of the discharge port by a predetermined angle to cover the discharge port; and the guide portion is disposed to have a distance between the guide portion and the discharge port in a direction perpendicular to the opening direction of the discharge port;

the heat storage tank further comprising:

a mixture protection member disposed between the collision member and an inner wall surface of the tank body, the mixture protection member having a plurality of through holes through which the fluid from the discharge port flows.

11. A heat storage tank comprising:

a tank body for thermally insulating and storing a fluid;

a first pipe member defining an introduction passage communicating with the tank body, the introduction passage having a discharge port from which the fluid introduced through the introduction passage is injected into the tank body;

a second pipe member defining a discharge passage having an introduction port from which the fluid in the tank body is introduced to be discharged outside the tank body through the discharge passage, the second pipe member being disposed adjacent to the first pipe member; and a shield portion disposed in the tank body, the shield portion including a collision wall surface with which fluid flowing out from the discharge port collides, the collision wall surface being disposed to face the discharge port and to be separated from the discharge port by a predetermined distance, and a guide wall surface extending from the collision wall surface for guiding the fluid after colliding with the collision wall surface such that the fluid after colliding with the collision wall surface is prevented from directly flowing toward the introduction port, wherein:

the introduction port and the discharge port are positioned at both opposite sides relative to the shield portion; and the collision wall surface and the guide wall surface of the shield portion have a moment center (G) that is located at a position separated from the discharge passage.

12. The heat storage tank according to claim 11, wherein the moment center (G) is located at a position offset to a side of the discharge passage relative to the introduction passage.

13. The heat storage tank according to claim 11, further comprising a mixture protection plate having a plurality of through holes penetrating through the mixture protection plate, the mixture protection plate being disposed opposite to the discharge port and being separated from the discharge port by a predetermined clearance, wherein:

the shield portion is disposed on a surface of the mixture protection plate to close the through holes of the mixture protection plate, at a side of the discharge port and around a portion with which the injection stream directly collides.

* * * * *